(12) United States Patent
Niemelä et al.

(10) Patent No.: US 8,590,045 B2
(45) Date of Patent: Nov. 19, 2013

(54) MALWARE DETECTION BY APPLICATION MONITORING

(75) Inventors: Jarno Niemelä, Espoo (FI); Pirkka Palomäki, Helsinki (FI)

(73) Assignee: F-Secure OYJ, Helsinki (FI)

( * ) Notice: Subject to any disclaimer, the term of this patent is extended or adjusted under 35 U.S.C. 154(b) by 260 days.

(21) Appl. No.: 12/587,521

(22) Filed: Oct. 7, 2009

(65) Prior Publication Data

US 2011/0083186 A1  Apr. 7, 2011

(51) Int. Cl.
  *H04L 29/06* (2006.01)
  *G06F 21/00* (2013.01)

(52) U.S. Cl.
  USPC .......................................................... 726/24

(58) Field of Classification Search
  None
  See application file for complete search history.

(56) References Cited

U.S. PATENT DOCUMENTS

| | | | |
|---|---|---|---|
| 7,594,272 B1 | 9/2009 | Kennedy et al. | 726/24 |
| 2003/0023873 A1* | 1/2003 | Ben-Itzhak | 713/201 |
| 2003/0149887 A1* | 8/2003 | Yadav | 713/200 |
| 2004/0015694 A1* | 1/2004 | DeTreville | 713/172 |
| 2004/0243829 A1* | 12/2004 | Jordan | 713/200 |
| 2007/0192859 A1 | 8/2007 | Shahar et al. | 726/22 |
| 2008/0043620 A1* | 2/2008 | Ye | 370/232 |
| 2010/0011029 A1* | 1/2010 | Niemel | 707/200 |
| 2010/0031361 A1* | 2/2010 | Shukla | 726/24 |

* cited by examiner

*Primary Examiner* — Gilberto O Barron, Jr.
*Assistant Examiner* — Malcolm Cribbs
(74) *Attorney, Agent, or Firm* — Harrington & Smith

(57) ABSTRACT

A method of detecting malware on a computer system. The method comprises monitoring the behavior of trusted applications running on the computer system and, in the event that unexpected behavior of an application is detected, identifying a file or files responsible for the unexpected behavior and tagging the file(s) as malicious or suspicious. The unexpected behavior of the application may comprise, for example, dropping executable files, performing modifications to a registry branch which is not a registry branch of the application, reading a file type class which is not a file type class of the application, writing portable executable (PE) files, and crashing and re-starting of the application.

14 Claims, 2 Drawing Sheets

MALWARE DETECTION BY APPLICATION MONITORING

TECHNICAL FIELD

The present invention relates to a method of detecting potential malware by monitoring the behaviour of trusted applications.

BACKGROUND

Malware is short for "malicious software" and is a term used to refer to any software designed to infiltrate or damage a computer system without the owner's consent. Malware includes computer viruses, worms, trojans, rootkits, adware, spyware and any other malicious and unwanted software.

When a computer device is infected by malware, most often in the form of a program or other executable code, the user may notice unwanted behaviour and degradation of system performance as the infection can create unwanted processor activity, memory usage, and network traffic. This can also cause stability issues leading to application or system crashes. Even if a malware infection does not cause a perceptible change in the performance of a device, the malware may be performing other malicious functions such as monitoring and stealing potentially valuable commercial or personal information, or hijacking a device so that it may be exploited for some illegitimate purpose.

Many end users make use of security and anti-virus software to detect and possibly remove malware. An example application is F-Secure™ Internet Security produced by F-Secure Corp., Helsinki, Finland. In order to detect a malware file, an anti-virus application must have some way of identifying it from amongst all the other clean and trusted files present on a device. Typically, this requires that the anti-virus software has a database containing "signatures" or "fingerprints" that are characteristic of individual malware files. When the provider of the anti-virus software identifies a new malware threat, the threat is analysed and a unique signature is generated. The malware is then classed as "known" and its signature can be distributed to end users as updates to their local anti-virus application databases, typically by distribution over the Internet.

Anti-virus applications may also make use of a database containing signatures of trusted files. These trusted files are those files published or authored by trusted sources. For example, those files that make up a piece of software distributed by a reputable software provider could be considered to be trustworthy such that, provided such files have not been modified since their publication/release, these files need not be scanned for malware. Only the suspected files need to be scanned.

Signature scanning is only one of the "weapons" available to providers of anti-virus applications. For example, another approach, commonly used in parallel with signature scanning, is to use heuristics (that is rules) that describe suspicious behaviour, indicative of malware. This is particularly relevant to detect a "Zero-day" exploit, which has not yet been identified by the anti-virus providers and for which no virus signature has been generated and distributed. Heuristics can be based on behaviours such as Application Programming Interface (API) calls, attempts to send data over the Internet, etc. Typically, heuristics may be combined, e.g. if target has feature 1 and feature 2 then it is malicious, or thresholds set, e.g. if target has more than 10 features it is malicious, in order to reduce the risk of false alarms.

A particular problem is the ability of malware to hijack trusted applications such as Microsoft™ (MS) Office Suite, Adobe Acrobat Reader/Writer™, and web browsers. One of the ways to achieve this is the so-called "buffer overflow attack". The buffer overflow attack is an attack in which malware causes an otherwise trusted application to write information into a buffer which exceeds the actual size of the buffer causing a buffer overflow. This may cause the programme to crash and, when the programme restarts, the attacker's code is executed instead of the program's valid process code. When executed, the attacker's code might, for example, open a communication channel to a malicious website from which further malware is downloaded and executed.

Of course, once a particular piece of malware that hijacks trusted programmes has been identified by the anti-virus provider, a signature may be generated and distributed to client devices. However, this may not always be effective, e.g. in the case of so-called "polymorphic" viruses which are able to mutate whilst maintaining the basic malware algorithm intact. Heuristic approaches remain significant for detecting such malware, and of course more importantly for detecting zero-day malware. Providers are continuously seeking to improve upon existing heuristic-based detection engines.

SUMMARY

It is an object of the present invention to detect potential malware by monitoring the behaviour of trusted applications to detect any unexpected behaviours.

According to a first aspect of the present invention there is provided a method of detecting malware on a computer system. The method comprises monitoring the behaviour of trusted applications running on the computer system. In the event that one or more unexpected behaviours of an application is/are detected, the method identifies a file or files responsible for the unexpected behaviour(s). It may further tag the file(s) as malicious or suspicious.

Whilst traditional heuristic approaches to malware detection monitor and detect the behaviour of untrusted files, the heuristic approach of the present invention looks at the behaviour of trusted applications. The present invention provides a further defence against malware attacks.

An unexpected behaviour of the trusted application may comprise one of:
  dropping an executable file;
  deleting executable files after execution;
  performing modifications to a registry branch which is not a registry branch of the application;
  reading or writing a file type class which is not a file type class normally associated with the application;
  writing to a data file which is not a data file associated with the application;
  writing portable executable files;
  crashing of the application followed by a re-start;
  disabling a security setting such as a firewall and/or disabling an anti-virus application;
  reading mail files;
  installing plugins to a web browser;
  initiating a network download from an unidentified source.

The method may comprise receiving at the computer system, from a central server, a list of trusted application and respective sets of unexpected behaviours. Said step of monitoring may comprise monitoring for the occurrence of the behaviours listed for the application.

The method may comprise terminating the application in the event that an unexpected behaviour of the application is detected.

The method may comprise identifying other files written by the application exhibiting the unexpected behaviour and tagging those files as malicious or suspicious. Said step of tagging the file may comprise locking the file to prevent it from being accessed and/or copied.

The method may involve tracing any external connections made by the application exhibiting the unexpected behaviour and blocking subsequent attempts to establish connections to the same destination.

According to a second aspect of the present invention there is provided a computer comprising an application monitor for monitoring the behaviour of trusted applications running on the computer. In the event that unexpected behaviour of an application is detected, the application monitor identifies a file or files responsible for the unexpected behaviour. It may tag the file(s) as malicious or suspiciou.

According to a third aspect of the present invention, there is provided a computer program for causing a computer to perform the steps of:
- monitoring the behaviour of trusted applications running on the computer;
- detecting one or more unexpected behaviours of an application; and
- identifying a file or files responsible for the unexpected behaviour(s).

The program may cause the identified file/s to be tagged as malicious or suspicious.

According to a fourth aspect of the present invention, there is provided a computer storage medium having stored thereon instructions for causing a computer to:
- monitor the behaviour of trusted applications running on the computer system;
- detect one or more unexpected behaviours of an application; and
- identify a file or files responsible for the unexpected behaviour(s).

The medium may have stored thereon instructions for causing the computed to tag the identified file(s) as malicious or suspicious.

DETAILED DESCRIPTION

Malware detection is carried out in a client-server based computer architecture. An anti-virus application runs on a multiplicity of client computers whilst a backend system runs on a server typically operated by the provider of the anti-virus application. [Typically the backend system is distributed over a pool or "cloud" of servers in order to provide sufficient capacity.] The server stores all up to date data relating to malware detection and sends this to the client computers. The malware detection data includes both virus signatures and heuristics. The server is continuously updated with new virus signatures and heuristics for suspected files. This distribution architecture is known.

In accordance with an embodiment of the present invention, the server also stores heuristics for monitoring the behaviour of trusted applications such as Microsoft Word, Excel, Power Point, Acrobat Reader/Writer etc and which are distributed to client computers. The anti-virus (AV) applications running in the client computers use these heuristics for malware detection. In particular, these heuristics identify, for a given trusted application, certain unexpected and therefore suspicious behaviour which, if detected in the trusted application, point to the fact that the trusted application has been hijacked.

A "trusted application" in this context may be an application that is certified as trusted or "clean" by a provider of security software, e.g. an anti-virus application, either based on some certificate issued by the application provider or following an anti-virus scan of the application. Other definitions of "trusted" may also be used. For example, a trusted application may be defined as such by a user who has created or installed an application on his or her own computer.

Figure 1:
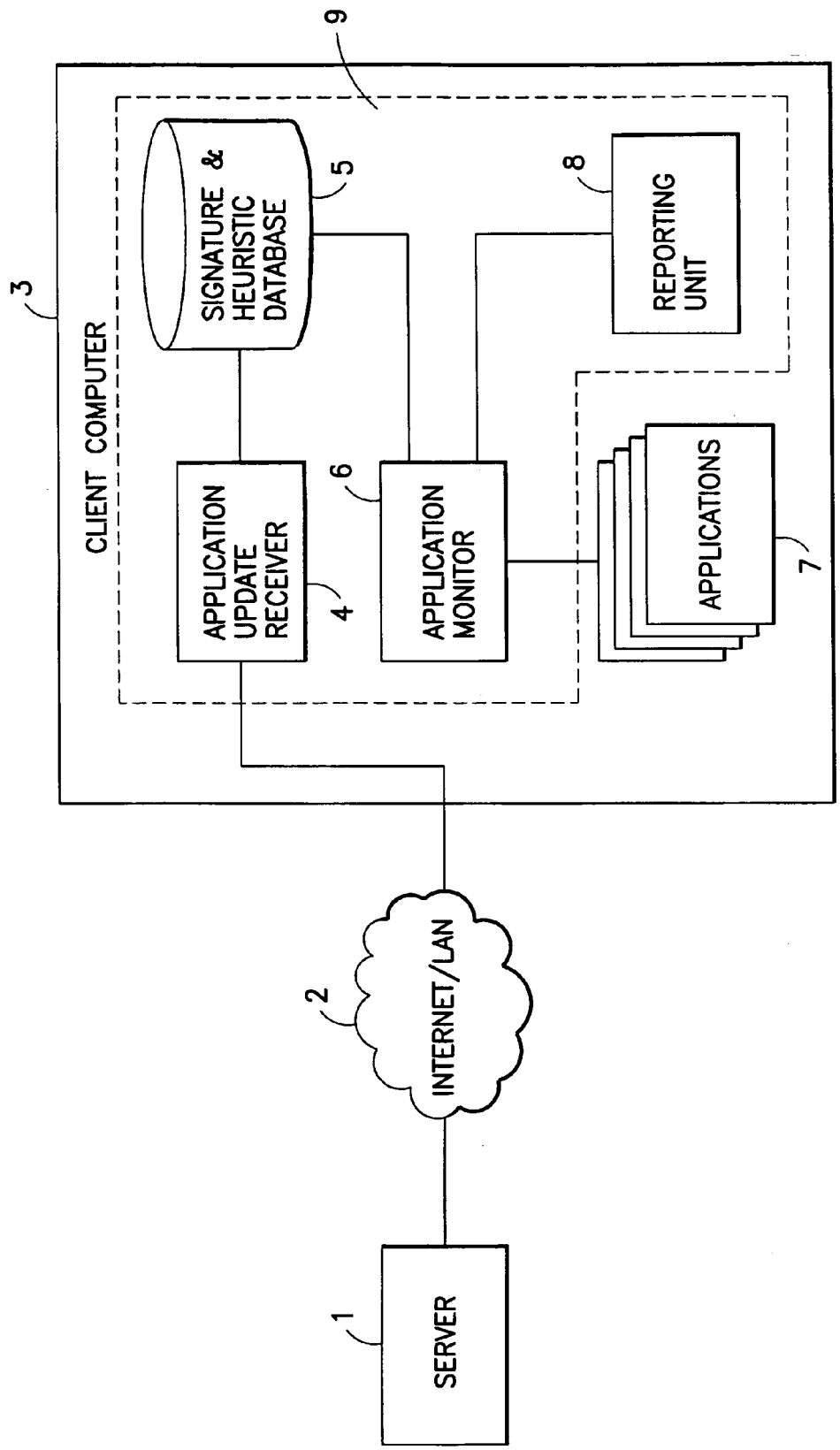
FIG. 1 illustrates schematically a computer system for detecting malware.

There is illustrated in FIG. 1 a computer architecture which comprises a server 1 connected to an example client computer 3 via a network 2. It will be appreciated that a multiplicity of client computers are also able to connect to the server 1 via the network 2. The network 2 is optionally the Internet or a LAN and the server 1 may belong to a pool of servers or to a server cloud. The client computer 3 may be a desktop personal computer (PC), laptop, personal data assistant (PDA) or mobile phone, or any other suitable computer system, and is configured to run a number of applications including a set of trusted applications 7 including, for example, applications of the Microsoft Office suite, Adobe Acrobat, web browsers, etc. The client computer 3 is additionally provided with an anti-virus application 9 and appropriate hardware resources for running the application, which together provide an application update receiver 4, a signature and heuristic database 5, an application monitor 6, and a reporting unit 8.

The application update receiver 4 is used to receive signatures and heuristics from the server 1. The virus signatures and heuristics are downloaded into the signature and heuristic database 5. The application monitor 6 accesses the database 6 during an application monitoring process. The reporting unit 8 is used for reporting a malware detection to the user and optionally to the AV application provider.

As already mentioned above, the server 1 stores heuristics for monitoring the behaviour of trusted applications. In particular, the server stores, for each of a set of trusted applications, a list of unexpected behaviours which may include, for example, one or more of the following:
- Dropping executable files. For example, dropping executable code into the "c/windows" line.
- Dropping an executable file and deleting the file after execution.
- Suspicious behaviour by a file written by the trusted application.
- Downloading files or instructions from a server which is not a server associated with the application provider. For example, an Adobe Acrobat application establishes network connections to check for updates, but to a server other than to Adobe's own server.
- Modifying of a registry branch which is not a registry branch of the application. Each application has certain branches or keys in the registry tree where they store their own settings, state information and/or other information which are critical for the operation of the application. For example, Adobe Acrobat writes only to its own registry branches (e.g. to HKEY_CLASSES_ROOT/acrobat). An unexpected behaviour of a trusted application may occur when it writes to registry branches associated with, for example, start-up information, firewall settings and other security settings.
- Modifying system security settings, such as disabling Windows firewall.

Killing anti-virus applications or other security applications.

Reading or writing a file type class which is not a file type class of the application. For example a ".doc" file should not cause Word to read from a ".ppt" file or to read Internet Explorer cache files or outlook address files.

Crashing of an application immediately upon, or shortly after launching of an application by a first file, followed by a re-start in respect of a second, different file. Such behaviour may be used by malware to hide executable code contained in the first file.

Installing plugins to Internet Explorer or other network browser.

Figure 2:
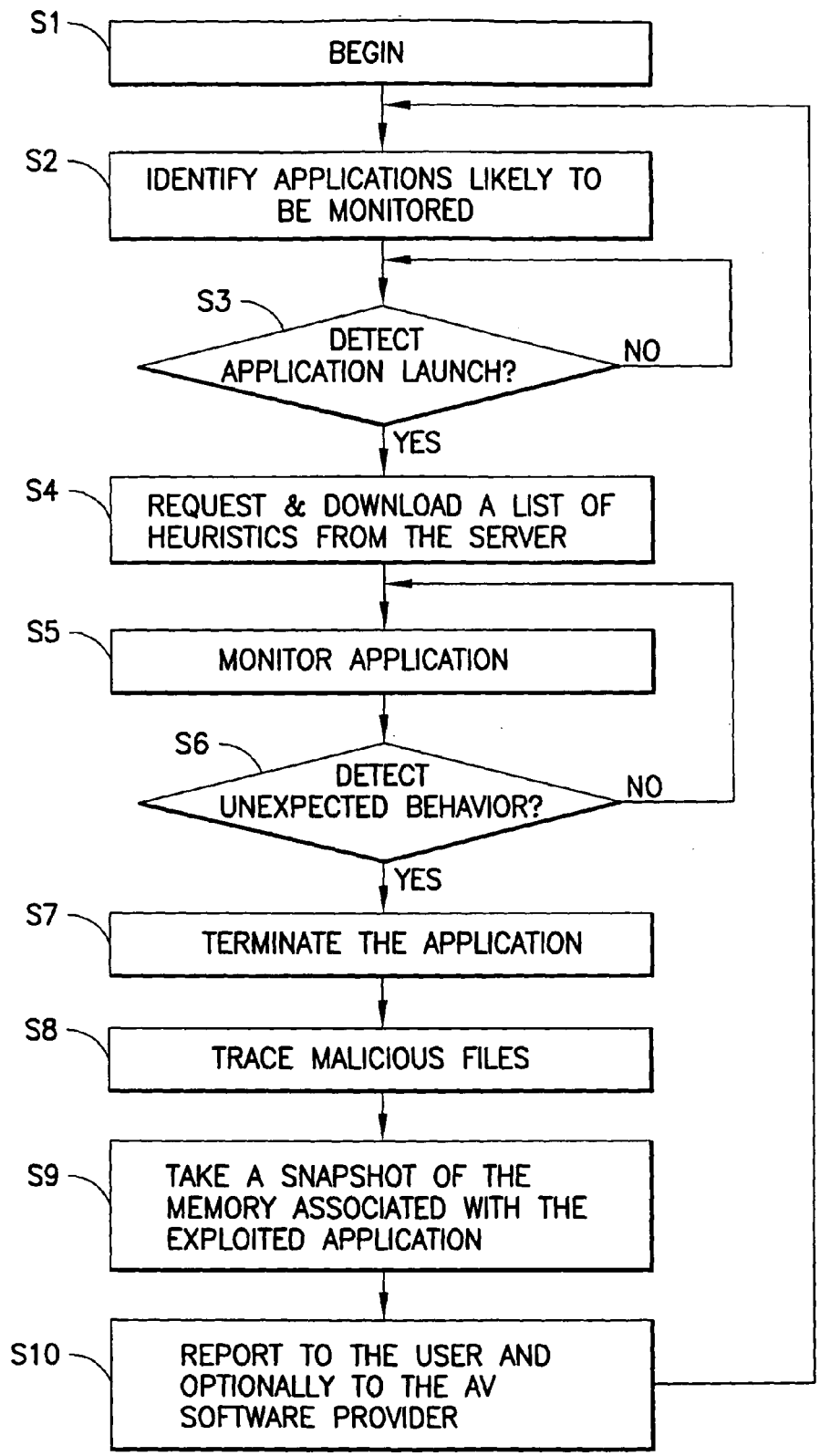
FIG. 2 is a flow diagram illustrating a process of detecting malware within the system of FIG. 1.

FIG. 2 is a flow diagram illustrating a procedure for scanning for malware at the client computer 3 using a trusted application behavioural monitoring approach. In particular, the figures shows the following steps:

S1. The process begins with the anti-virus application being launched immediately upon booting of the client computer, or upon demand by the user. The application runs as a background process on the computer, and is substantially "invisible" to the user except in the event of malware detection.

S2. The application monitor of the anti-virus application communicates with the signature and heuristic database to identify certain trusted applications which are at risk of being hijacked by malware. This list is downloaded into the signature and heuristic database from the server, and may be periodically updated.

S3. The application monitor continuously checks to see when a trusted application is launched.

S4. Once the launch of a trusted application is detected by the application monitor, the anti-virus application requests a list of unexpected behaviours for the launched application from the server.

S5 and 6. The application monitor monitors the behaviour of the launched trusted application, looking in particular for the occurrence of behaviours contained in the unexpected behaviours list.

S7. In the event that an unexpected behaviour is detected at S6, the application monitor immediately terminates the currently running trusted application that is exhibiting the unexpected behaviour. For example, when the application monitor detects that Microsoft Word has started to read a mail history and/or browsing history, the application monitor terminates the Word application so as to prevent any further malicious activity. Other related processes may also be terminated, e.g. a web download.

S8. After terminating the trusted application, the application monitor traces the file(s) responsible for the unexpected behaviour and tags them as malicious. For example, when the application monitor recognises that Microsoft Word has been hijacked, the application monitor traces the .doc file responsible and tags it as malicious. It may also be desirable to similarly tag all files created and handled by the hijacked application. Tagging of a file may comprise adding the file identity and/or location to a list of suspected malware or corrupted files. Tagging of a file may comprise locking the file to prevent it from being opened, copied or transferred. The file(s) may also be deleted and or an attempt to repair it/them made. The application monitor may identify other related suspicious activities. For example, if a hijacked application has connected to an unknown server, the corresponding IP address may be identified (and subsequently blocked at a firewall).

S9. The application monitor takes a snapshot of the memory associated with the exploited application.

S10. The application monitor reports to the user that the application has been terminated due to detection of a potential malware attack. The application monitor optionally reports to the anti-virus application provider via the Internet, providing details of the attack and identifying the malicious file(s) responsible, other affected files, and any related suspicious activities. The background monitoring processes continue operating in the client computer.

It will be appreciated that the lists of unexpected behaviours of the trusted applications can be stored in a cache memory of the client computer, e.g. in the signature and heuristic database. In this way, the client computer does not have to connect to the server each time a trusted application is launched. Updates of the behaviour lists may be pushed to the client computer (or pulled to it) together with other signature and heuristics updates.

It will be appreciated by the person of skill in the art that various modifications may be made to the above described embodiments without departing from the scope of the present invention. For example, it will be appreciated that, rather than apply a list of unexpected behaviours to detect potential malware, i.e. a black list of behaviours, a list of expected behaviours or white list may be used. In this case, for a given trusted application, occurrence of a behaviour not on the whitelist may be considered "unexpected", resulting in termination of the application and tagging of the responsible file or files as malicious. Of course, both a black list and a white list may be used together, with other behaviours being considered suspicious rather than malicious. Black lists and white lists of behaviours are typically determined in a test environment operated by the anti-virus application provider, e.g. using clean applications running in a virtual system.

The content processed, viewed or displayed and which is responsible for hijacking a trusted application may be, for example, a document file (word document, PowerPoint or PDF), image file (JPEG), structured content (HTML or XML) or movie file (AVI, MPEG, DVD). A trusted application may be for example Microsoft Office software, PDF viewer, image viewer, web browser, movie player or similar application. Of course, these file and application types are only examples and many other types will be apparent to the skilled person.

The invention claimed is:

1. A method of detecting malware on a computer system, the method comprising:
   receiving at the computer system, from a central server, a list of trusted applications and respective sets of unexpected behaviours;
   identifying certain trusted applications from the list running on the computer system, which are at risk of being hijacked by malware;
   monitoring the behaviour of the identified trusted applications and,
   in an event that one or more unexpected behaviours of the identified trusted application is detected, identifying a file or files which is or are responsible for the unexpected behaviour and which has or have hijacked that trusted application.

2. A method according to claim 1, wherein an unexpected behaviour of the application comprises one of:
   dropping an executable file;
   deleting executable files after execution;
   performing modifications to a registry branch which is not a registry branch of the application;
   reading or writing a file type class which is not a file type class normally associated with the application;

writing to a data file which is not a data file associated with the application;

writing portable executable files;

crashing of the application followed by a re-start;

disabling a security setting such as a firewall and/or disabling an anti-virus application;

reading mail files;

installing plugins to a web browser;

initiating a network download from an unidentified source.

3. A method according to claim 1 wherein said step of monitoring comprises monitoring for the occurrence of the behaviours listed for the application.

4. A method according to claim 1 and comprising terminating the application in the event that an unexpected behaviour of the application is detected.

5. A method according to claim 1 and comprising tagging the identified file(s) as malicious or suspicious.

6. A method according to claim 5 and comprising identifying other files written by the application exhibiting the unexpected behaviour and tagging those files as malicious or suspicious.

7. A method according to claim 5, said step of tagging the file comprising locking the file to prevent it from being accessed and/or copied.

8. A method according to claim 1 and comprising tracing any external connections made by the application exhibiting the unexpected behaviour and blocking subsequent attempts to establish connections to the same destination.

9. A computer comprising a processor and a memory including computer executable instructions, wherein the processor and the memory are configured to cause the computer to:

receive a list of trusted applications and respective sets of unexpected behaviours from a central server, wherein the processor identifying certain trusted applications from the list running on the computer, which are at risk of being hijacked by malware;

monitor the behaviour of the identified trusted applications; and in an event that unexpected behaviour of the identified trusted application is detected, identify a file or files which is or are responsible for the unexpected behaviour and which has or have hijacked that trusted application.

10. A computer according to claim 9, said processor being further configured to tag the identified file(s) as malicious or suspicious.

11. A non-transitory computer program stored on a non-transitory storage medium for causing a computer to perform the steps of:

receiving, from a central server, a list of trusted applications and respective sets of unexpected behaviours;

identifying certain trusted applications from the list running on the computer, which are at risk of being hijacked by malware;

monitoring the behaviour of the identified trusted applications;

detecting one or more unexpected behaviours of the identified application; and identifying a file or files which is or are responsible for the unexpected behaviour(s) and which has or have hijacked that trusted application.

12. A computer program according to claim 11 for causing a computer to perform the further step of tagging the identified file(s) as malicious or suspicious.

13. A non-transitory computer storage medium having stored thereon non-transitory instructions for causing a computer to:

receive, from a central server, a list of trusted applications and respective sets of unexpected behaviours;

identify certain trusted applications from the list running on the computer system, which are at risk of being hijacked by malware;

monitor the behaviour of the identified trusted applications;

detect one or more unexpected behaviours of the identified application; and identify a file or files which is or are responsible for the unexpected behaviour(s) and which has or have hijacked that trusted application.

14. A computer storage medium according to claim 13 having stored thereon instructions to cause a computer to tag the identified file(s) as malicious or suspicious.

* * * * *